US005907760A

United States Patent [19]

Choi et al.

[11] Patent Number: 5,907,760

[45] Date of Patent: May 25, 1999

[54] FABRICATION METHOD FOR MOLYBDENUM DISILICIDE SINTERED BODY

[75] Inventors: Ju Choi; Young Do Kim, both of Seoul; Myoung Ki Yoo, Kyungki-Do; Seung Ick Lee, Seoul, all of Rep. of Korea

[73] Assignee: Korea Institute of Science and Technology, Seoul, Rep. of Korea

[21] Appl. No.: 08/829,058

[22] Filed: Mar. 31, 1997

[30] Foreign Application Priority Data

May 31, 1996 [KR] Rep. of Korea .................. 19186/1996

[51] Int. Cl.[6] ........................................................ B22F 3/12

[52] U.S. Cl. ................................ 419/32; 419/38; 419/57; 419/58

[58] Field of Search ................................. 419/32, 36, 38, 419/57, 58

[56] References Cited

U.S. PATENT DOCUMENTS 5,733,427 3/1998 Satou et al. ........................ 204/298.13

*Primary Examiner*—Daniel J. Jenkins
*Attorney, Agent, or Firm*—Morrison & Foerster, LLP

[57] ABSTRACT

A fabrication method for a molybdenum disilicide sintered body in which a molybdenum disilicide powder having excellent oxidation resistance is sintered in a low-temperature sintering method and compacted at a low temperature and under no pressure, includes carrying out a milling on a molybdenum disilicide powder at a low temperature, providing a diffusion path required to sinter the molybdenum disilicide on which a milling is performed, and sintering the resultant powder under the atmosphere of hydrogen or argon gas.

6 Claims, 2 Drawing Sheets

EXAMPLE 1, 2
EXAMPLE 3
AVERAGE GRAIN SIZE:
10μm
SINTERING TEMP (°C)
RELATIVE DENSITY(SINTERED DENSITY/THEORETICAL
DENSITY X 100)(%)
1100
1200
1300
1400
1500
1600
50
60
70
80
90
100

1500℃
1300℃
500℃
WEIGHT CHANGE(mg/cm²)
OXIDATION TIME (hr)
0.005
0.004
0.003
0.002
0.001
0.000
-0.001
-0.002
0
50
100
150
200
250
300
350
400
450
500

FABRICATION METHOD FOR MOLYBDENUM DISILICIDE SINTERED BODY

BACKGROUND OF THE INVENTION

1. Field of the Invention

The present invention relates to a fabrication method for a molybdenum disilicide ($MoSi_2$) sintered body, and more particularly, to a low-temperature sintering method for a molybdenum disilicide powder in which molybdenum disilicide powder having an excellent oxidation resistance is molded at a low temperature and under no pressure so as to fabricate a high density sintered product.

2. Description of the Prior Art

Generally, since molybdenum disilicide has a high melting point (2030° C.), a low density (6.3 g/cc) and excellent oxidation resistance, it is commonly referred to as super kanthal and is used as a high temperature heating element.

The reason that molybdenum disilicide has an excellent oxidation resistance characteristic is that silicon (Si), one of composing elements of the molybdenum disilicide, is combined with oxygen in air to form silica ($SiO_2$) which is an oxidation-resistant layer on the surface of the sintered product, which prevents oxygen from being diffused to the inside of the material.

However, as reported in recent publication (Mat. Res. Soc. Symp. Proc. vol.322.1994), the sintering of a powder material is generally carried out at 1600° which corresponds to about 80% of the melting point even when the average powder grading is about 1 micron, and several to tens of hours are disadvantageously required to carry out such process.

Since a fabrication process which requires a long time at a high temperature needs much energy, and causes an increase in the fabrication cost of the product, a hot pressing method has been adopted wherein heat and pressure are applied together to sinter a powder material within a short time at a low temperature.

However, such hot pressing method requires a separate apparatus, resulting in an increase in fabrication cost.

A representative example that has been studied to solve such problem is the method of mechanically mixing the powder or employing a milling process. In case of molybdenum disilicide, if powders of molybdenum and silicon are mechanically mixed, molded and heated, about 90% of the theoretical density can be obtained by combustion synthesis within one hour at the temperature range of 1400~1450° C. under no pressure, according to one report disclosed in Mat. Res. Soc. Symp. Proc. vol.364.1995.

However, to utilize molybdenum disilicide as a high temperature material, its mechanical characteristics and oxidation resistance have yet to be estimated, and the powder materials must not be polluted by air since they are to be mixed or alloyed.

SUMMARY OF THE INVENTION

Accordingly, it is an object of the present invention to provide an improved fabrication method for a molybdenum disilicide sintered body in which a high density sintered product can be easily fabricated at a low temperature and under no pressure.

To achieve the above object, an improved fabrication method is provided for a molybdenum disilicide sintered body. Increasing a driving force required for sintering by micronizing the powder and providing an easy diffusion path for material transport during the sintering by adding a third element, a low-temperature milling is performed on the molybdenum disilicide powder to prevent molybdenum and silicon from being easily oxidized in air.

BRIEF DESCRIPTION OF THE DRAWINGS

The present invention will become more fully understood from the detailed description given hereinbelow and the accompanying drawings which are given by way of illustration only, and thus are not limitative of the present invention, wherein.

DETAILED DESCRIPTION OF THE PREFERRED EMBODIMENTS

Figure 1:
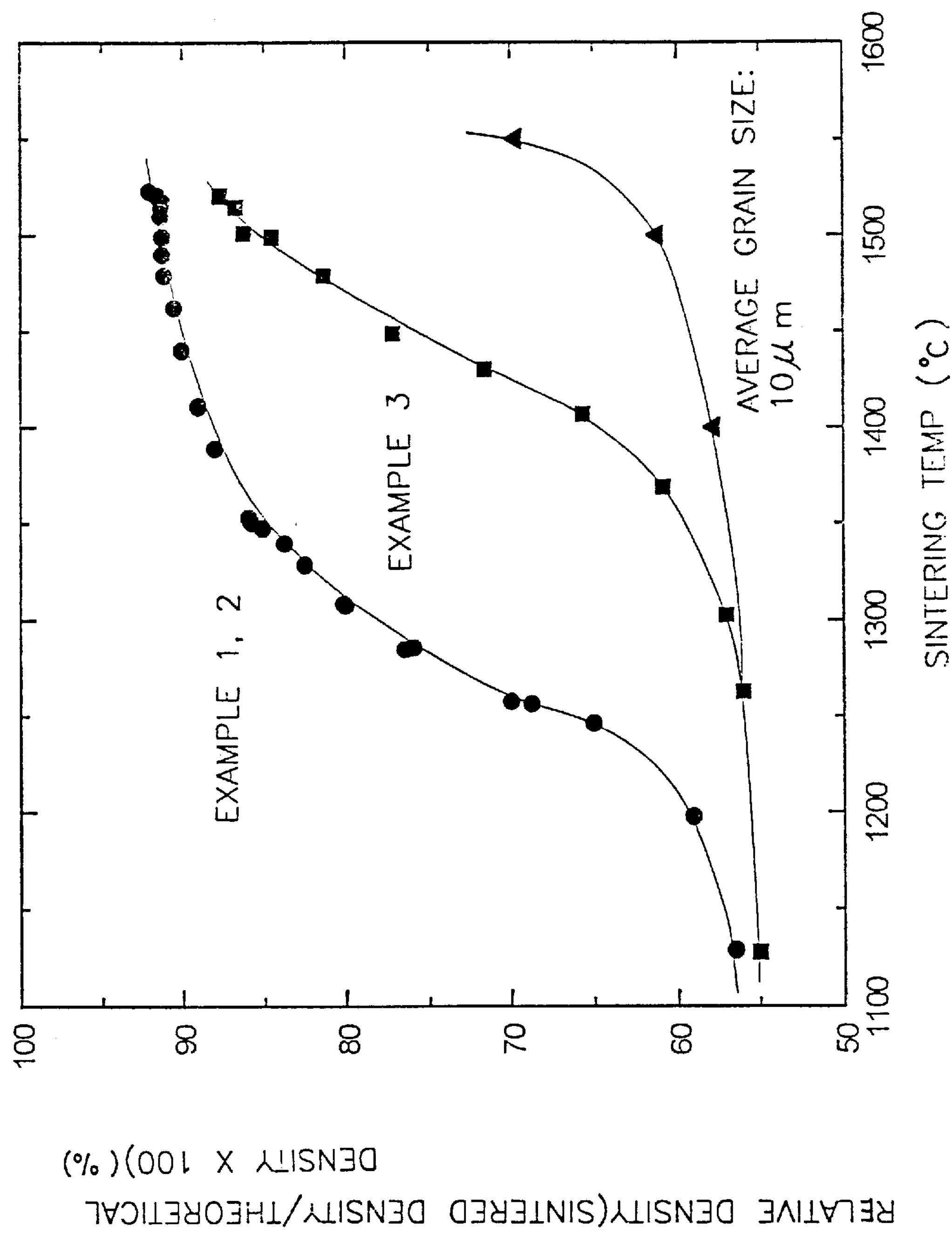
FIG. 1 is a graph showing the change of a relative density according to the increase of a sintering temperature of a molybdenum disilicide powder according to the present invention.

According to the present invention, a milling is carried out on a molybdenum disilicide powder instead of molybdenum and silicon, and accordingly, an average powder size can be reduced to one tenth the conventional size.

Further, when iron (Fe) or nickel (Ni) are added as a third alloying element for providing an easy diffusion path necessary for sintering into a powder, a sintering density corresponding to over 90% of a theoretical density even under no pressure can be obtained. Here, a heating temperature is 1400° C., and the time required is less than one hour, namely, within 10 minutes.

In a molybdenum disilicide product fabricated according to the present invention, there occurs no sudden oxidation phenomenon which is caused by the formation of volatile molybdenum generated when the molybdenum disilicide is heated in air at 400~600° C., and an excellent oxidation resistance to air at 1300~1500° C. are characteristics similar to super kanthal which is used as a conventional heating element.

As another method of adding iron or nickel used as a third element, in performing a milling, the effect of micronizing a powder size can be achieved without a separate addition of iron or nickel by using a stainless steel comprising iron, nickel and chromium as the material for a balls and a container employed in the milling process.

The sintering method for a molybdenum disilicide powder according to the present invention will become more fully understood from the descriptions of the embodiments given hereinbelow.

EMBODIMENT 1

A milling was carried out at the rotating speed of 75times per minute for 72 hours with a ten to one ratio of the balls and molybdenum disilicide powder having an average powder size of 10 microns, resulting in the reduction to one micron of the average size.

Also, milling was performed after acetone was filled up to half of the milling container to protect the micronized powder from air and to reduce the possibility that powder could be partially heated in the ball milling.

After the thusly prepared powder was mixed with 0.1~4.5 weight percent of iron powder and 0.1~3.5 weight percent of nickel powder, the resultant was compacted under the compacting pressure of 170~300 MPa and was sintered under the atmosphere of hydrogen or argon.

As a result, a sintered body which had over 90 percent of a relative density (sintered density/theoretical density) was fabricated at around 1400° C.

EMBODIMENT 2

A stainless steel containing iron and nickel was used as a material for balls and a container, and ball milling wascarried out under the same conditions as those of embodiment 1.

The same result as of embodiment 1 was obtained without a additional addition of iron and nickel.

EMBODIMENT 3

To ascertain an enhanced sintering characteristic of molybdenum disilicide resulting from the embodiments 1 and 2, iron and nickel having the same weight percent range as in embodiment 1 were added to ten microns of molybdenum disilicide to which ball milling was not carried out and the resultant was sintered at 1400° C.

Consequently, when iron and nickel were not added, the sintered density was 55~57% which was a relative density of the compact. But the density increased to 75~80% when iron and nickel were added.

Therefore, it was ascertained that the additional iron and nickel enhanced the sintering characteristics of molybdenum disilicide.

FIG. 1 shows the results of a sintered density obtained from the embodiments 1,2 and 3 as a function of temperature, whereby the sintering time was five minutes. For a relative comparison of the sintering characteristics, a change of a sintered density is shown depending on temperature for a pure molybdenum disilicide powder having an average size of ten microns and which does not contain iron or nickel as a third element.

As described in detail above, the sintered density of molybdenum disilicide containing iron and nickel is increased at a low temperature irrespective of an average size of the powder used, and particularly, when an average of the initially used molybdenum disilicide is one micron, an increase of a sintered density, that is, a densification is enhanced at the temperature range of 1200~1400° C. This is an improved result in comparison with the case that one hundred hours were required at 1600° C. in obtaining 90% of a theoretical density by using a molybdenum disilicide powder having an average size of one micron.

Figure 2:
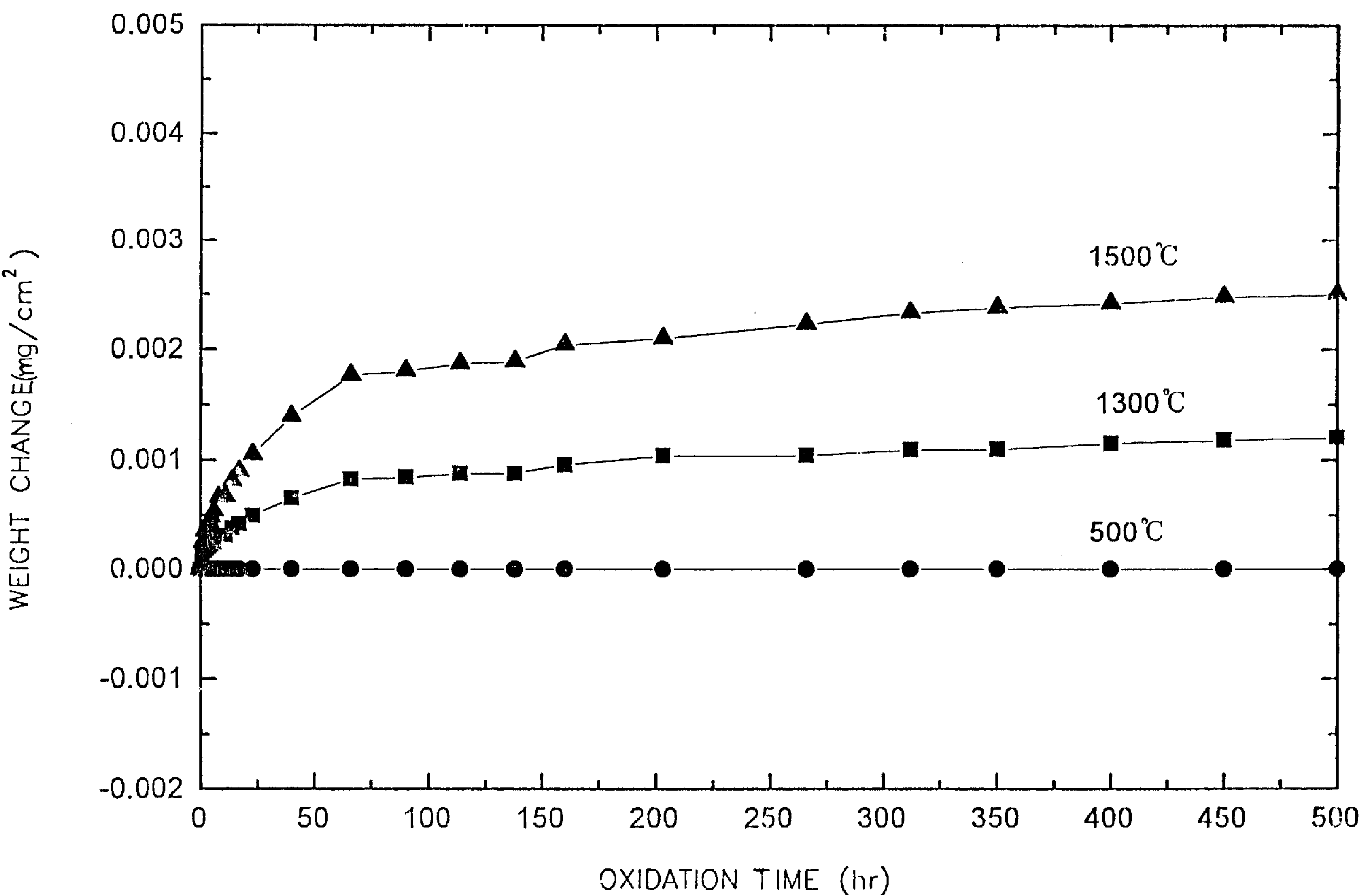
FIG. 2 is a graph showing a weight change in accordance with the passing of time, that is, degree of oxidation for a molybdenum disilicide sintered body according to the present invention.

FIG. 2 shows the result of observation of an oxidation characteristic for the sintered body having 90% of a theoretical sintering density for five hundred hours at the temperatures of 500, 1300 and 1500° C., adopting a method of the embodiment 1 according to the present invention.

In this experiment, there appeared no situation that the shape of the molybdenum disilicide was not maintained due to pesting phenomenon (that is, an abrupt oxidation) at 500° C. The weight was a increased by a small amount at an initial stage at 1300 and 1500° C., but no oxidation response is proceeded.

As described above, a low-temperature sintered product of molybdenum disilicide having an excellent oxidation resistance can be obtained according to the fabrication method for a molybdenum disilicide powder sintered body.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A fabrication method for a sintered body of molybdenum disilicide powder, comprising:

carrying out a milling on a molybdenum disilicide powder at a predetermined temperature;

providing a diffusion path required for sintering the molybdenum disilicide powder on which a milling is performed;

sintering the resultant powder in an atmosphere of hydrogen or argon gas; and wherein the diffusion path is formed by adding iron and nickel.

2. The method of claim 1, wherein the addition of the iron ranges from 0.1 to 4.5 weight percent, and that of the nickel ranges from 0.1 to 3.5 weight percent.

3. The method of claim 1, wherein in the process of providing a diffusion path required to sinter the molybdenum disilicide powder, is carried out by using balls and a container made of stainless steel when milling is performed on the powder.

4. The method of claim 1, wherein the milling is carried out at a rotating speed of 75 times per minute for 72 hours with a ten to one ratio of the balls and the molybdenum disilicide powder.

5. The method of claim 1, wherein the milling is performed after acetone is filled up to one half of a milling container, while a predetermined temperature is maintained.

6. The method of claim 1, wherein the sintering temperature in the sintering process ranges from 1200 to 1400° C.

* * * * *